US011887750B2

(12) United States Patent
Staubli et al.

(10) Patent No.: US 11,887,750 B2
(45) Date of Patent: Jan. 30, 2024

(54) APPARATUS AND METHOD FOR PROCESSING A PLURALITY OF ELECTRICAL WIRES

(71) Applicant: KOMAX HOLDING AG, Dierikon (CH)

(72) Inventors: Dominik Staubli, Horw (CH); Markus Bucher, Buchrain (CH); Beat Suter, Steinen (CH)

(73) Assignee: KOMAX HOLDING AG, Dierikon (CH)

( * ) Notice: Subject to any disclaimer, the term of this patent is extended or adjusted under 35 U.S.C. 154(b) by 1205 days.

(21) Appl. No.: 16/241,055

(22) Filed: Jan. 7, 2019

(65) Prior Publication Data

US 2019/0221331 A1 Jul. 18, 2019

(30) Foreign Application Priority Data

Jan. 12, 2018 (EP) .................................... 18151465

(51) Int. Cl.
  *H01B 13/02* (2006.01)
  *H01B 13/012* (2006.01)
  (Continued)

(52) U.S. Cl.
  CPC .............. *H01B 11/02* (2013.01); *B65B 27/06* (2013.01); *H01B 13/0207* (2013.01);
  (Continued)

(58) Field of Classification Search
  CPC ............ H01B 13/0292; H01B 13/0278; H01B 13/0207; H01B 13/01263; H01B 13/01272; H01B 13/01281; H01B 13/08
  See application file for complete search history.

(56) References Cited

U.S. PATENT DOCUMENTS

2013/0047815 A1\* 2/2013 Takahashi ................. B23C 3/30
                                                                       83/875
2017/0035007 A1   12/2017 Mabuchi

FOREIGN PATENT DOCUMENTS

CN      107123482 A    9/2017
EP       1032095 B1    5/2013
               (Continued)

OTHER PUBLICATIONS

Communication dated Jul. 24, 2018 from the European Patent Office in application No. 18151465.4.
(Continued)

*Primary Examiner* — Livius R. Cazan
(74) *Attorney, Agent, or Firm* — Sughrue Mion, PLLC

(57) ABSTRACT

An apparatus to process a plurality of electrical wires as well as a method that uses the apparatus are indicated. The apparatus includes a feed device, a stationary holding device, a holding device that is non-stationary along a linear guiding direction, a non-stationary bundling device that is separate from the non-stationary holding device and a controller connected to a drive of the non-stationary bundling device. The stationary holding device and/or the non-stationary holding device are configured to twist the respectively held end of the wires; The controller controls the drive in such a way that a distance between a bundling segment of the non-stationary bundling device and the non-stationary holding device assumes a specified or a specifiable distance.

11 Claims, 7 Drawing Sheets

(51) Int. Cl.
*H01B 11/02* (2006.01)
*H04N 23/56* (2023.01)
*B65B 27/06* (2006.01)
*H01R 43/28* (2006.01)

(52) U.S. Cl.
CPC ....... *H04N 23/56* (2023.01); *H01B 13/01263* (2013.01); *H01R 43/28* (2013.01)

(56) References Cited

FOREIGN PATENT DOCUMENTS

| | | | |
|---|---|---|---|
| EP | 2599093 A2 | | 6/2013 |
| JP | 2001122525 A | * | 5/2001 |
| JP | 2004028623 A | * | 1/2004 |
| JP | 2014186834 A | | 10/2014 |
| WO | 2012015057 A2 | | 2/2012 |

OTHER PUBLICATIONS

Komax AG: "New Das Kundenmagazin", 2016, Seiten 1-24, XP055491772, URL:http://www.komaxgroup.com/-/mediaWire/Files/Downloads/News/Komax_News_2016_2_DE.pdf.

\* cited by examiner

APPARATUS AND METHOD FOR PROCESSING A PLURALITY OF ELECTRICAL WIRES

TECHNICAL FIELD

The disclosure relates to an apparatus to process a plurality of electrical wires as well as a method, which uses the apparatus.

In certain applications, a plurality of electrical wires, which are guided next to each other in a bundle-like manner—thus meaning cable with a plurality of individual wires, which are initially not wrapped around or not wrapped around at their full length—are assembled in cable processing devices in an automated manner and then twisted. An assembly typically entails that the individual wires are cut at at least one of their ends, stripped and/or provided with contacts, grommets, etc. Usually, twisted wires, in particular, twisted wire pairs are fitted with connector housings or the like.

The plurality of wires are guided in such a conventional cable processing device along different working regions of the apparatus. Typically, one of ends of the wire bundle is pulled through these working regions so that a leading end of the wire bundle, which is guided in the direction of the pulling motion and a lagging end of the wire bundle can be defined.

BACKGROUND ART

The twisting of the wires can also be desired for signalling reasons, for example, in order to reduce common-mode interference coupled into a wire pair or it can be carried out for the sake of simple handing of the wires for further processing. Due to mutually being wrapped, a twisted plurality of wires has a smaller length than the same wires in a non-wound up (i.e., non-twisted or less twisted) state.

EP 1 032 095 B1 shows a cable processing device with a twisting function. In this most recent background art, two wires are drawn in at the same time and assembled. The leading wire ends are first transported into the pulling direction and then are transferred to a twisting device. The twisting device comprises a stationary holding module, which holds the lagging wire ends in a fixed position during the twisting process, as well as a twisting head, which can be moved in the cable-guiding direction and can grip the leading wire ends and wrap (twist) them around each other. Due to the shortening occurring during the twisting process, the twisting head is realigned along the guiding direction in the direction of the stationary holding module, wherein a pulling-force measurement serves as a reference variable.

EP 2 777 053 B1 describes another cable processing device with a twisting function. Here, two wires are successively drawn in, assembled and pulled out again. Afterwards, they are transferred together to a twisting device. The twisting device has a twisting head to twist the wires on their leading end and a twisting head to twist the wires on their lagging end. One of the twisting heads is realigned along the guiding direction in order to compensate for the shortening occurring during the twisting process.

In order to prevent that the twisted wires unwind ("untwist") against their twist, it is known to fix the twisted wires in position. Typically, the twisted wires are wrapped with adhesive tape. DE 20 2015 001 990 U1 shows a bundling head, which bundles a twisted end of a wire pair by it wrapping a defined area with an adhesive tape.

Problems to be Solved with the Disclosure

If a known bundling head to bundle a bundling region should be arranged on the leading wire end, this is typically moveable along the guiding direction since twisted wires should be manufactured with different lengths. The position at which the adhesive tapes should be attached must be determinable for the bundling head in a sufficiently precise manner. However, the precise length and position of the leading wire end in the guiding direction is also not identical to one another in the case of similar twisted wires, for example, because the realigning movement of the twisting head for the leading wire end takes place in a force-regulated and not in a length-regulated manner.

If the bundling head for the leading wire end is mounted and moved together with the twisting head for the leading wire end, the mass of this unit is relatively large. Furthermore, this large mass would also have to be moved if the cable processing device carries out its operation where only twisting takes place but the bundling head is not used.

It is an object of the present disclosure to provide an apparatus or a method to process a plurality of electrical wires, which make a precise positioning of a non-stationary bundling device possible in a simple manner, such as, for example, a non-stationary bundling head.

Solution to the Problems

In accordance with the present disclosure, an apparatus to process a plurality of electrical wires according to claim 1 is indicated.

In embodiments, the apparatus comprises a feed device, which is configured to guide a leading end of a plurality of wires through a zone of the processing region.

A plurality of wires typically comprises two wires, however, it can also comprise more than two wires. A processing region, as is used herein, comprises a region, in which mechanical manipulations can be performed on a plurality of wires, in particular, on an end of a plurality of wires. Manipulations comprise, for example, holding the wires, picking up and transferring the wires, cutting the wires and the wire ends, stripping the wires and the wire ends, fitting the wires and the wire ends, for example, with contacts or grommets.

The apparatus furthermore comprises a stationary holding device arranged within the zone of the processing region, which is configured to hold a lagging end of the wires, as well as a holding device which is non-stationary along a linear guiding direction that is configured to hold the leading end of the wires.

The linear guiding direction typically corresponds to the direction the guided wire ends run. Typically, the non-stationary holding device is configured to pull out a leading wire end held by it belonging to a plurality of wires along the linear guiding direction.

The stationary holding device is configured to twist the wire end held by it. In addition or as an alternative, the non-stationary holding device is configured to twist the wire end held by it.

Twisting, as is used herein, typically describes a process where the respective wire ends are twisted against each other around their axis of extension so that they wrap around each other. In particular, the twisting of a wire end also includes that such a mutual wrapping around of the wire ends continues beyond the axis of extension of the wires, typically being continued up until the other wire end respectively.

The apparatus furthermore comprises a non-stationary bundling device. The non-stationary bundling device can be moved separately from the non-stationary holding device by means of a controllable drive. The non-stationary bundling device comprises a bundling segment, wherein the bundling segment is configured to bundle a bundling region on the leading end of the wires.

Bundling, as is used herein, comprises, for example, that the bundling region is manipulated in such a way that the twisting of the twisted wires is fixed and, in particular, that the twisting is not made void or is not notably made void. For example, a fixing element is attached within the bundling region when bundling. Typically, the fixing element is an adhesive tape, wherein the adhesive tape is wrapped around the wires in the bundling region. The bundling can take place by means of the bundling segment of the bundling device.

The apparatus furthermore comprises a controller, which is connected to the drive of the non-stationary bundling device. The controller is configured that it controls the drive in such a way that a distance between the bundling segment of the stationary bundling device and the non-stationary holding device assumes a specified or a specifiable distance.

In the apparatus disclosed herein, the bundling segment of the non-stationary bundling device can be positioned with sufficient precision on the bundling region on the leading end of the wires in order to carry out the bundling process. The non-stationary bundling device can be moved separately from the non-stationary holding device. The mass of the non-stationary bundling device only then needs to be driven if the non-stationary bundling device is used.

Further embodiments of the technology disclosed herein are indicated in the dependent claims.

In embodiments, the apparatus furthermore comprises a distance measuring device. The distance measuring device is configured in such a way that it measures the distance between the bundling segment of the non-stationary bundling device and the non-stationary holding device. In addition, the controller is additionally connection to the distance measuring device.

The distance measuring device can, for example, comprise an indirectly arranged distance measuring device, for example, a first distance sensor, which is mounted at a defined point and measures the distance from the defined point to the non-stationary holding device, and a second distance sensor, which is mounted to the same point or to a different defined point, and measures the distance from this defined point to the non-stationary bundling device, in particular, to the bundling segment of the non-stationary bundling device.

Examples for the distance measuring device comprise a magnetostrictive position measuring system, and magnetic position measuring system or an optical position measuring system. Other examples for the distance measuring device comprise a position indicator and path-sensor device, wherein the position indicator is arranged on a linear guide of the non-stationary holding device. An example of a linear guide of the non-stationary holding device is a guide carriage.

The distance measuring device is typically configured in such a way that it supplies the measured distance to the controller; the controller is typically configured in such a way that it controls the drive of the non-stationary holding device using the measured distance in such a way that the specified or specifiable distance is assumed. By means of this, the bundling segment of the bundling head can be brought into a desired position or distance from the non-stationary holding device in a sufficiently precise manner. Typically, the specified or specifiable distance defines a position of the bundling region on the leading end of the wires.

In embodiments, the apparatus furthermore comprises a stationary bundling device. The stationary bundling device is arranged in the processing region of the apparatus and is configured in such a way that it bundles a bundling region on the lagging end of the wires. Typically the stationary bundling device is constructed similarly or identically to the non-stationary bundling device.

In embodiments, the controller is furthermore configured to determine the position of the bundling region on the leading end of the wires from a distance to a first intersecting position of the wires on the leading end. The first intersecting position of the wires is the position, starting from the respective end in question, at which the wires abut each other for the first time to form the twisted state and intersect with one another. The first intersecting position of the wires on the leading end can be specified to the controller, from which it can determine the position of the bundling region on the leading end of the wires.

In embodiments, the non-stationary bundling device, the stationary bundling device or both the non-stationary bundling device as well as the stationary bundling device are configured in such a way that they wrap the wires with a bundle binder in the respective bundling region. In particular, the bundle binder can be designed as an adhesive tape.

In embodiments, the non-stationary bundling device, the stationary bundling device or both the non-stationary bundling device as well as the stationary bundling device are configured in such a way that they comprise a positioning device independent from the drive. The respective positioning devices is configured in such a way that it positions the bundling segment of the respective bundling device with reference to the respective wire end to be bundled.

In embodiments, the non-stationary holding device can be moved along a holding device linear guide, and the non-stationary bundling device can be moved along a bundling device linear guide. The holding device linear guide and the bundling device linear guide are separate from one another and run in parallel to one another.

In embodiments, the non-stationary bundling device, the stationary bundling device or both the non-stationary bundling device as well as the stationary bundling device each comprise a sensor, in particular, an optical sensor. Each sensor is configured in such a way that an associated first intersecting position of the wires can be detected. In addition or as an alternative, each sensor is configured in such a way that it detects the presence of the bundle binder. In addition or as an alternative, each sensor is configured in such a way that it detects the position of the bundle binder with relation to a defined position the wire, typically an associated wire end. By means of this, the quality of the bundled planarity of wires can be further improved.

Typically, the controller is configured in such a way that it uses a detection result from the sensor to control the drive. For example, the detection result indicates the first intersecting position of the wires starting from the respective wire end in question. By means of this, the positioning of the bundling segment relative to the bundling region of the bundled wires can be further improved.

In embodiments, the sensor comprises an optical line sensor. The first intersecting position of the wires, starting from the respective wire end in question is assumed at a position that corresponds to the position on the optical line sensor, at which the difference of the signal intensity of the adjacent image points of the optical line sensor exceeds a predetermined threshold.

In an alternative embodiment, the sensor comprises an optical sensor with an illumination means and a digital camera.

In the case of a method to process a plurality of electrical wires disclosed herein, an apparatus disclosed herein is used. The method entails holding a leading end of the wires with the non-stationary holding device, and holding a lagging end of the wires with the stationary holding device in the zone of the processing region, and twisting the wires on the leading end against the lagging end and/or twisting the wires on the lagging end against the leading end. After completion of the twisting or during the twisting, the method provides for a control of the drive, which occurs in such a way that the distance between the bundling segment of the non-stationary bundling device and the non-stationary holding device assumes a specified or a specifiable distance. The method furthermore entails bundling, using the non-stationary bundling device, of a bundling region on the leading end of the wires and/or bundling, using the stationary bundling device, of a bundling region on the lagging end of the wires.

By means of the method, a bundling of a twisted plurality of wires can be automated. For example, the distance can be specified via a user interface. Typically, the method furthermore entails specifying the distance relative to a first intersecting position of the wires on the leading end. In accordance with this, the distance can be capable of being specified as a position relative to the respective first intersection point of the wire end in question.

In embodiments, the method furthermore entails detecting the presence of the bundle binder or the position of the bundled binder, determining from the detection results if a quality criterion and has been fulfilled, and outputting a signal depending on the determination.

A quality criterion, as is used herein, can, for example, include if or if not the bundle binder, which is, for example, an adhesive tape, is present at one or at each of the bundling regions, or if the position of the bundle binder is within a tolerance range for the specified or the specifiable distance.

BRIEF DESCRIPTION OF THE DRAWINGS

In the following, embodiments of the disclosure will be explained in more detail based on the enclosed drawings. The figures show.

DESCRIPTION OF THE EMBODIMENTS

Figure 1:
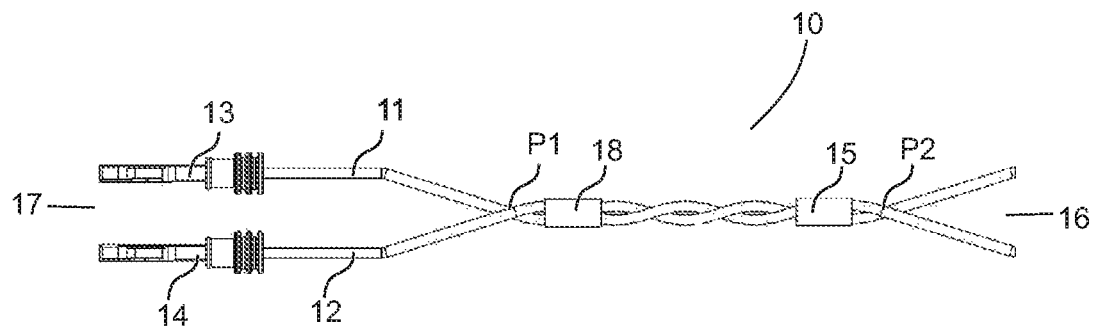
FIG. 1 a twisted wire pair to clarify the terms used herein.

FIG. 1 shows a twisted wire pair 10 of a first line 11 and a second line 12. The number of two wires 11, 12 of the wire pair 10 is descriptive and not restrictive, and it more than two wires, 11, 12 can be provided as well.

An end 16 of the wire pair 10 is defined as a leading end, which is guided through a processing region of an apparatus 100 described taking FIGS. 3 to 10 into account to process the plurality of electrical wires 11, 12. The other end 17 of the wire pair is defined as the lagging end.

At the lagging end 17, a first contact 13 and a second contact 14 are attached to wires 11 and 12. A region between the ends 16, 17 is a twisted, meaning the wires 11, 12 wrap around each other.

At the leading end 16, a bundle binder is attached within a bundling region 15, for example, an adhesive tape. Similarly, a bundle binder, for example, an adhesive tape is attached at the lagging end 17 in a bundling region 18. The bundle binders at the bundling regions 15, 18 prevent the twisting of the wires 11, 12 loosens. The wires 11, 12, in FIG. 1 are tied by means of bundle binders.

Starting from the leading end 16, the wires 11, 12 overlap and intersect for the first time at a first intersection point P2. Similarly, the wires 11, 12 overlap and intersect starting from the lagging end 17 for the first time at a first intersection point P1. The bundling regions 16, 18 are positioned around a certain distance from the respective first intersection point P2 or P1.

Figure 2:
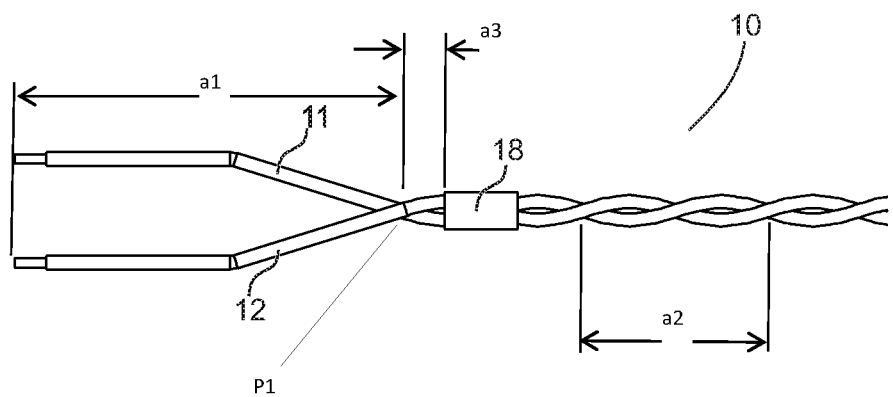
FIG. 2 a region of the wire pair from FIG. 1 with other aspects for clarification.

For the sake of explanation, a partial region of the wire pair 10 is shown again in FIG. 2. The untwisted ends of the wires 11, 12 on the lagging wire end have a length a1. At the first intersection point P1, a distance a3 follows until the beginning of the bundle binder in the bundling region 18. The distance between two identical intersections and crossings of the wires 11, 12 in the twisted region is specified as the pitch length a2.

Figure 3:
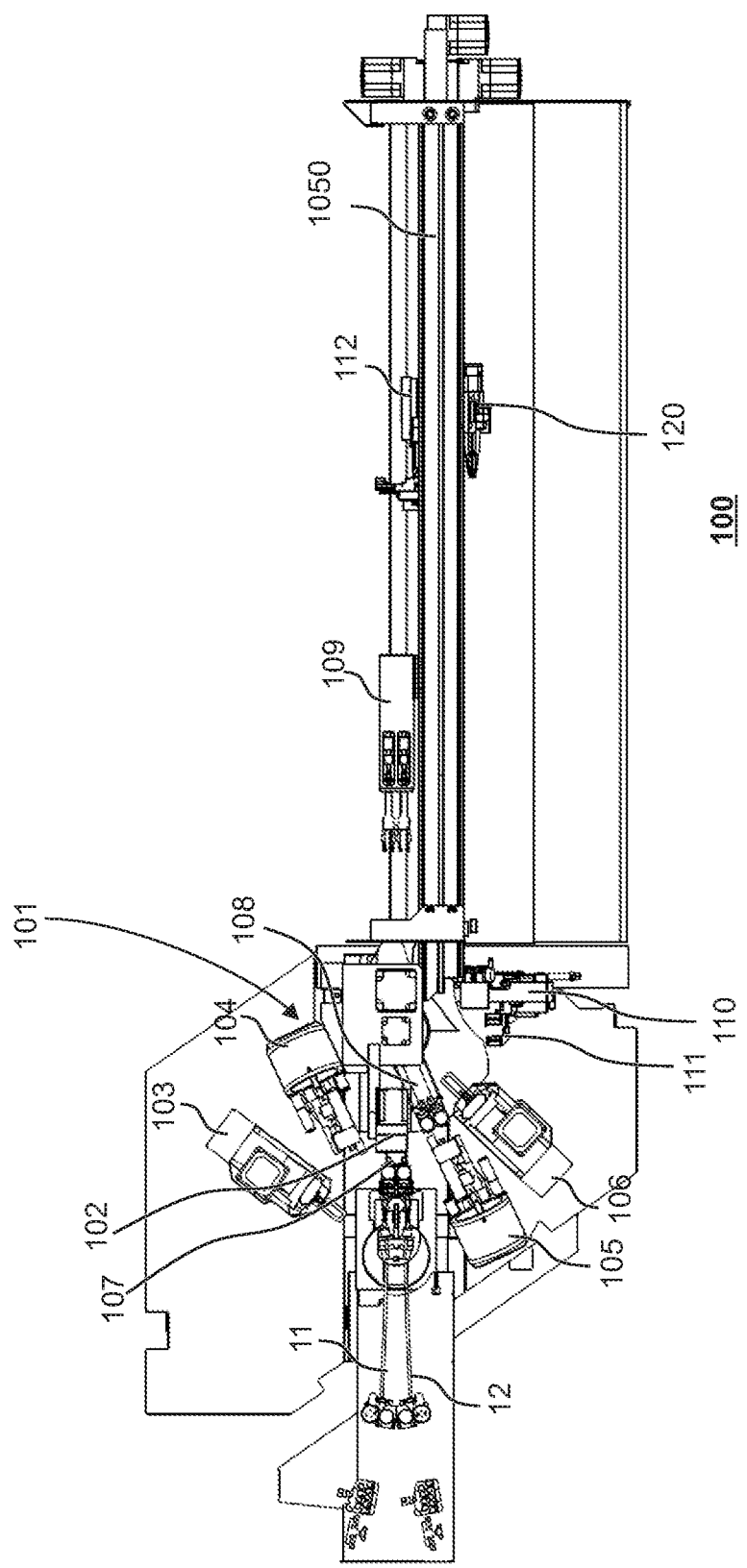
FIG. 3 in order to explain the aspects disclosed herein, a top view of an apparatus for processing a plurality of electrical wires without a non-stationary bundling device.

In FIG. 3, for the sake of explanation, an apparatus 100 to process the plurality of electrical wires 11, 12 is shown without a non-stationary bundling device.

In FIG. 3, the leading ends of the wires 11, 12 are guided into a processing region 101, from where they can be guided along a machine axis on a guide rail 1050. Processing modules 103, 104, 105, 106 can carry out manipulations on the wires 11, 12 in the processing region 101.

The leading ends of the wires 11, 12 are stripped by a cutting head 102 and are supplied on the one side to successive processing modules 103, 104 using a first swivel unit 107. Here, for example, a grommet and a contact can be mounted to the wire end for example.

Then, the first swivel unit 107 brings the wires 11, 12 back into the direction of the machine axis. There, they are guided through until they can be gripped by the extraction carriage 109. The wires 11, 12 are pulled out along the guide rail 1050 by the extraction carriage depending on the desired wire length in the defined linear guiding direction.

The wires 11, 12 are then gripped by a second swivel unit 108 and severed and stripped by the cutting head 102. The lagging wire ends are fed to the processing modules 105, 106 on the other side by the second swivel unit 108 and fully assembled, meaning, for example, in turn, provided with a grommet and a contact.

A transfer module 111 takes over the lagging wire ends 11, 12 and transfers them, following a swivelling movement, to a stationary holding device 110. A transfer module 112 transfers the leading wire ends 11, 12 to a non-stationary holding device 120.

The stationary holding device 110, the non-stationary holding device 120 or both holding devices 110, 120 are respectively designed to twist the ends of the wires 11, 12 held by them. For example, the non-stationary holding device 120 comprises a twisting head, which can be rotated around the machine axis, thereby carrying out the twisting process. The non-stationary holding device 120 is moved in the direction of the stationary holding device 110 during the twisting process in order to compensate for the shortening of the wires 11, 12.

Figure 4:
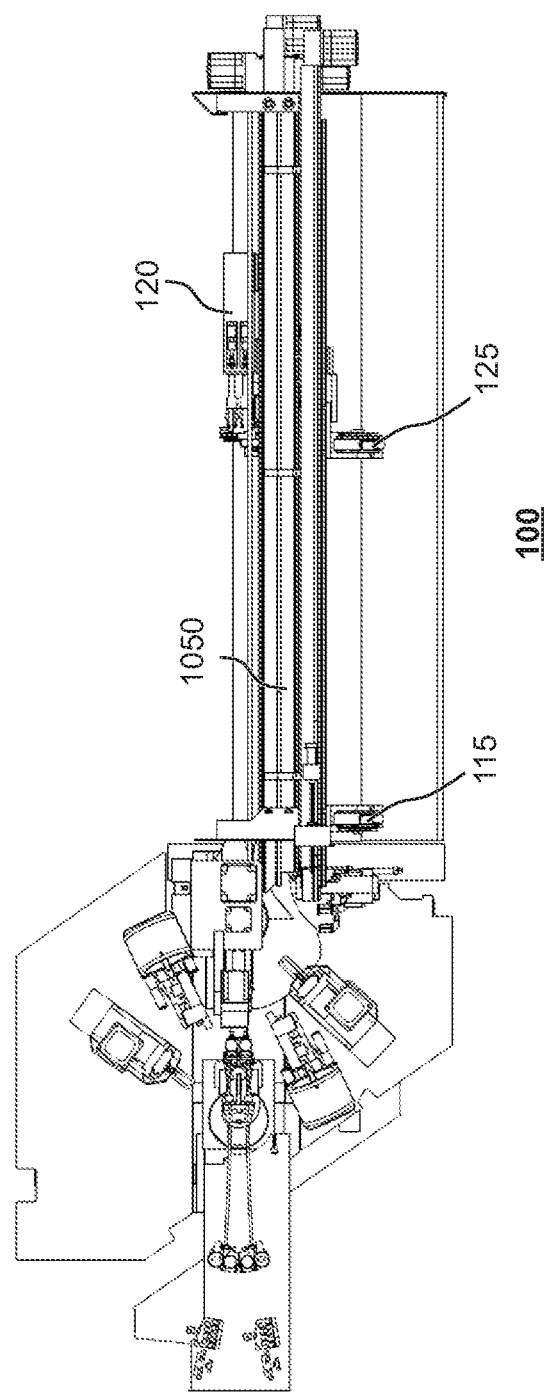
FIG. 4 a top view of an apparatus similar to the one shown in FIG. 3 in accordance with an embodiment of the disclosure.

In FIG. 4, the apparatus 100 from FIG. 3 is shown, wherein a non-stationary bundling device 125 is additionally provided. Optionally, as is shown in FIG. 4, a stationary bundling device 115 can also be provided in the processing region 101. The bundling devices 115, 125 are, for example, designed as bundling heads, as they are known from DE 20 2015 001 990 U1, and they each comprise a bundling segment 116 and 126, in which the bundling regions 115, 125 can be wrapped with a bundle binder, for example, an adhesive tape. The stationary bundling device 115 is, for example, identical to the non-stationary bundling device 125 so that it can be positioned in the direct vicinity of the adjacent assemblies respectively.

The bundling heads 115, 125 can be moved on an additional linear guide separately from the holding devices 110, 120, parallel to the movement direction of the non-stationary holding device 120.

Figure 5:
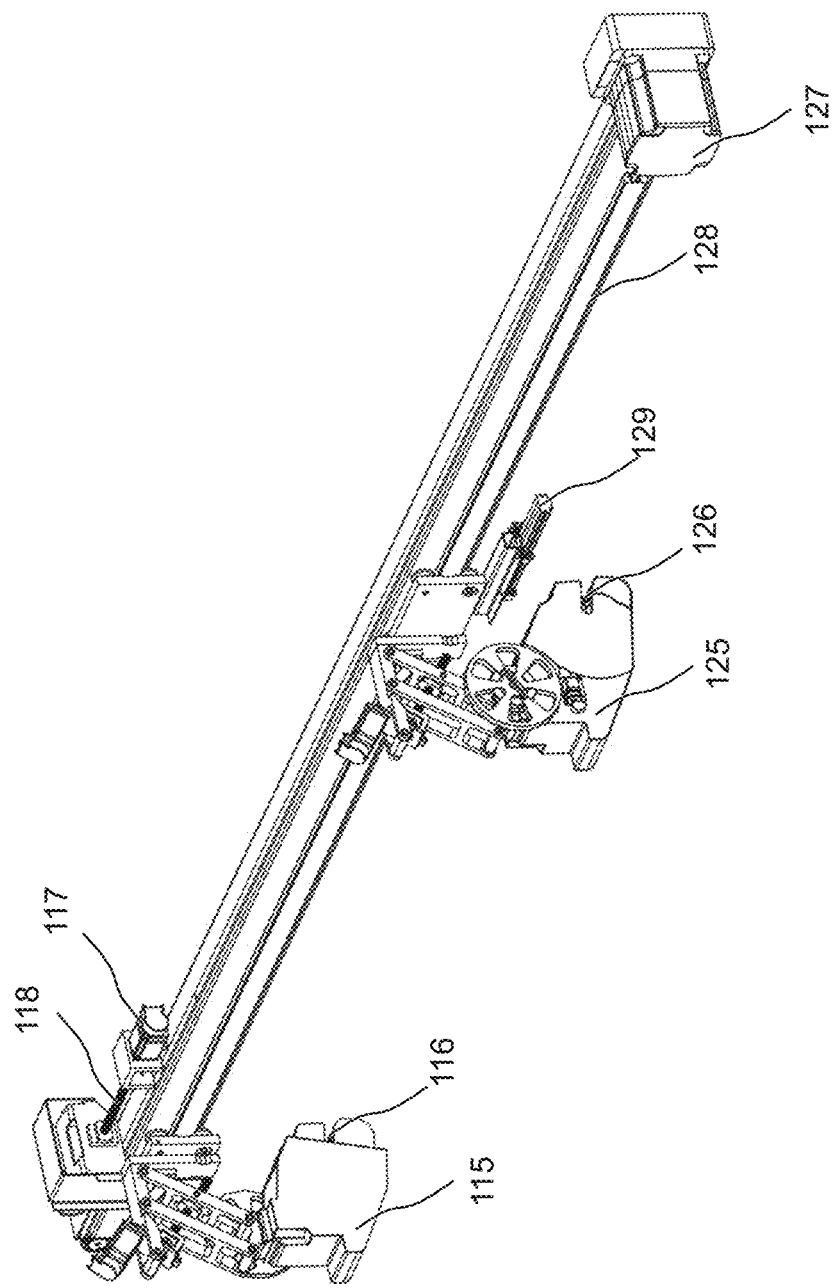
FIG. 5 a partial aspect of the apparatus from FIG. 4 in a perspective view.

FIG. 5 shows the bundling devices or the bundling heads 115, 125 on the guidance device 1050 separately in a perspective view. In FIG. 5, the non-stationary bundling device 125 is connected to a servomotor 127 via a toothed belt 128. The servomotor 127 and the toothed belt 128 form a non-restrictive example for a drive and can move the non-stationary bundling device across a wide range along the guidance device 1050. The stationary bundling device 115 can be moved over a small range via a drive formed of a servomotor 117 and a spindle 118.

In FIG. 5, a distance measuring device 129 is fixedly connected to the non-stationary bundling device 125 and is configured in such a way that it can output a distance signal, which directly or indirectly indicates a distance between the bundling segment 126 of the non-stationary bundling device 125 and the non-stationary holding device 120, to a controller.

Figure 6:
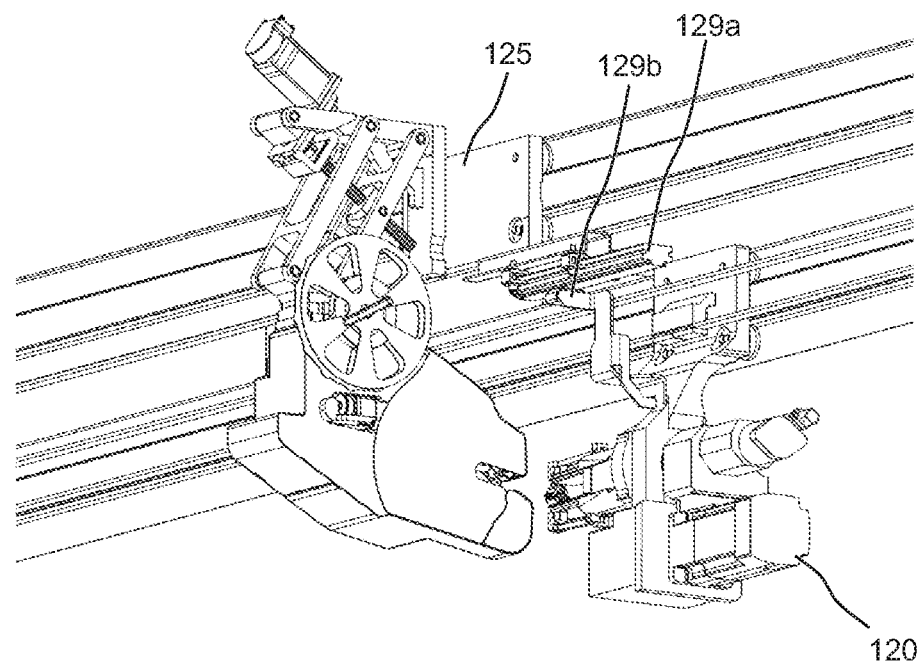
FIG. 6 another partial aspect of the apparatus from FIG. 4 in a perspective view.

FIG. 6 shows the distance measuring device 129 in a perspective detailed view, which, for example, is formed of a position sensor 129a and a position indicator 129b. The position indicator 129b is connected to the carriage of the non-stationary holding device 120.

Figure 7:
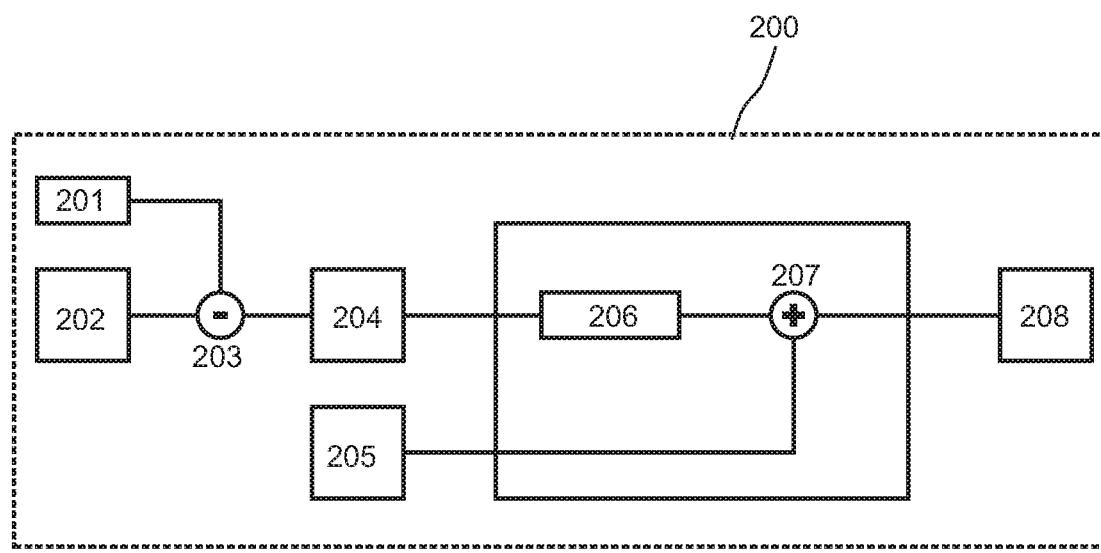
FIG. 7 a block diagram of a controller for the apparatus shown in FIG. 4 with a position regulation system.

FIG. 7 shows a block diagram of a controller 200, which is configured to control the drive 127, 128. The controller 200 guides a position regulation system, which is implemented with the aid of the distance measuring device 129, of the non-stationary bundling device 125 relative to the non-stationary holding device 120.

In FIG. 7, a desired distance 201 and a signal 202 from the distance measuring device 129 are subtracted from one another and the difference is provided to a PI controller 204, which outputs the deviation as a preliminary control signal 206. The instantaneous movement 205 of the non-stationary bundling device 125, the position of which is regulated to compensate for the shortening is added to the preliminary control signal 206 and the resulting signal is output as a control signal 208 for the positioning of the non-stationary bundling device 125.

Similarly, if a stationary bundling device 115 is used, the controller 200 can then generate a control signal for the fine positioning of the stationary bundling device 115 by means of its drive 117, 118 in order to position the bundling segment 116 on the lagging end of the wires 11, 12.

A controller 200, which carries out the method disclosed herein, is, for example, contained in a machine controller of an apparatus disclosed herein. The machine controller can calculate the geometry of the twisted wires to be expected from the process parameters, in particular, the length a1 of the untwisted wire ends (see FIG. 2), the position of the intersection points P1, P2 etc. From this, the relative positions can be determined, to which the bundling devices 115, 125 are to be brought. Examples of the process parameters include the desired cable length, the pitch length and the cable cross section the cable spacing in the gripping devices used.

While the lines 11, 12 are assembled, pulled out and twisted, the bundling devices 115, 125 are brought outside of the cable axis. Before completion of the twisting, the bundling devices 115, 125 are positioned in the axis direction of the wires 11, 12 so that the bundle binder can be attached to the desired position. Thereby, the non-stationary bundling device 125 is realigned in a regulated manner depending on the movement of the non-stationary holding device 120.

Figure 8:
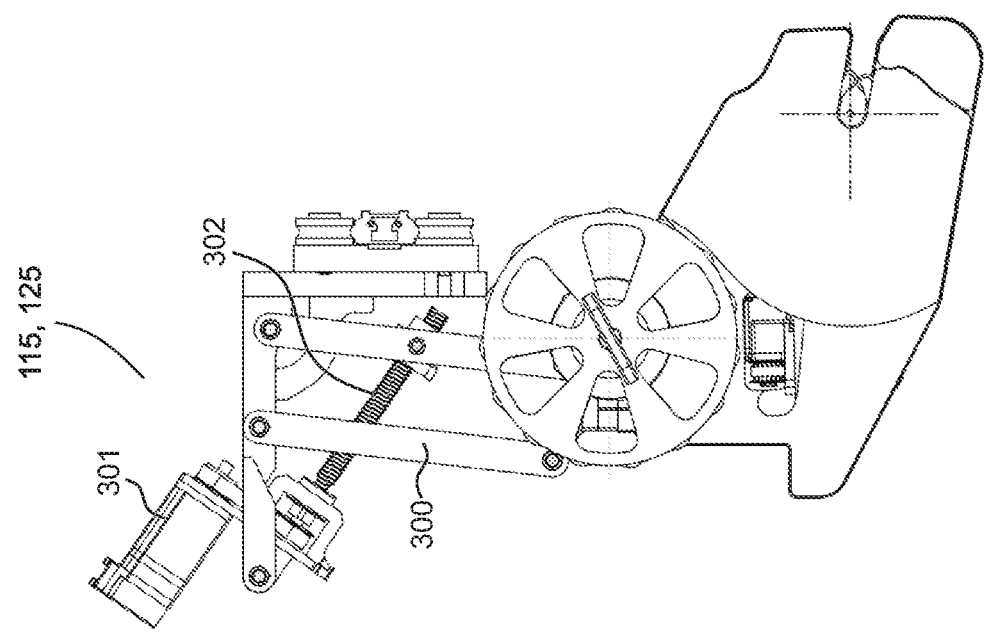
FIG. 8 a lateral view of a bundling device of the apparatus from FIG. 4.
Figure 9:
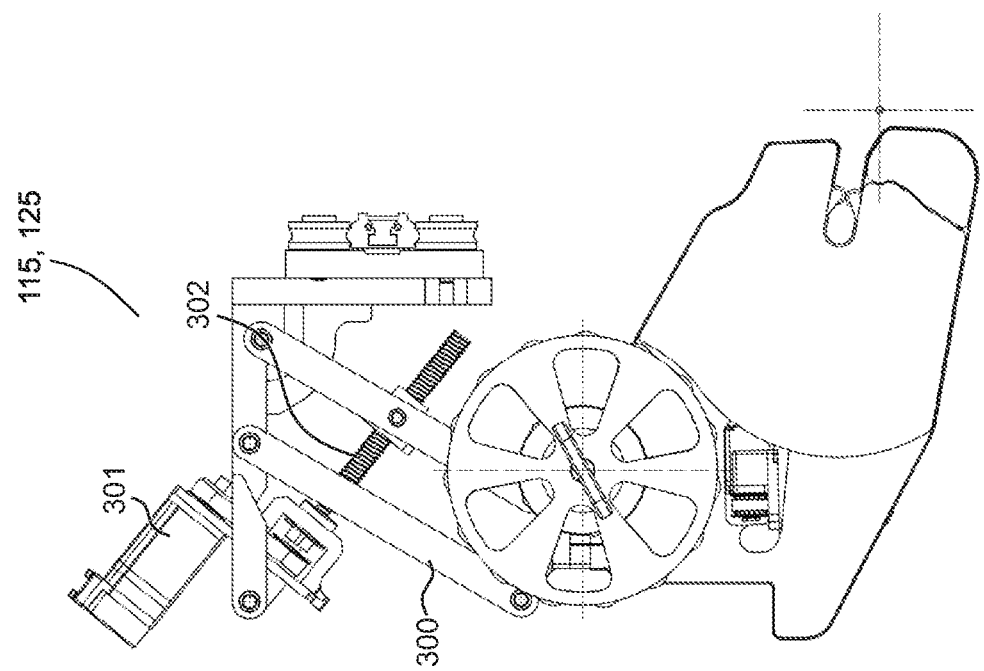
FIG. 9: another lateral view of the bundling device of the apparatus from FIG. 4 in another position.

After completing the twisting process, the respective bundling devices 115, 125 can be brought across the respective bundling region 15, 18. For this purpose, the respective bundling devices 115, 125, as is shown in FIG. 8 and FIG. 9, are suspended on a parallelogram linkage 300, which can be adjusted by means of a drive formed of a servomotor 301 and a spindle 302 between the position shown in FIG. 8 and the position shown in FIG. 9. Alternatively, other actuators can also be used for adjustment, such as pneumatic actuators or other mechanical solutions. This arrangement allows for the bundling devices 115, 125 to be able to be positioned without the actual twisting process being impaired. The bundling devices bring the bundle binders to the bundling regions 15, 18.

Optical sensors can be provided in order to detect improperly bundled wires 11, 12. For example, an evaluation of the optical sensor is used to sort out improperly bundled wire pairs 10 automatically. The optical sensors can also be used to detect other parameters of the wires 11, 12, for example, a correct stripping or a correct fitting with grommets and/or contacts.

Figure 10:
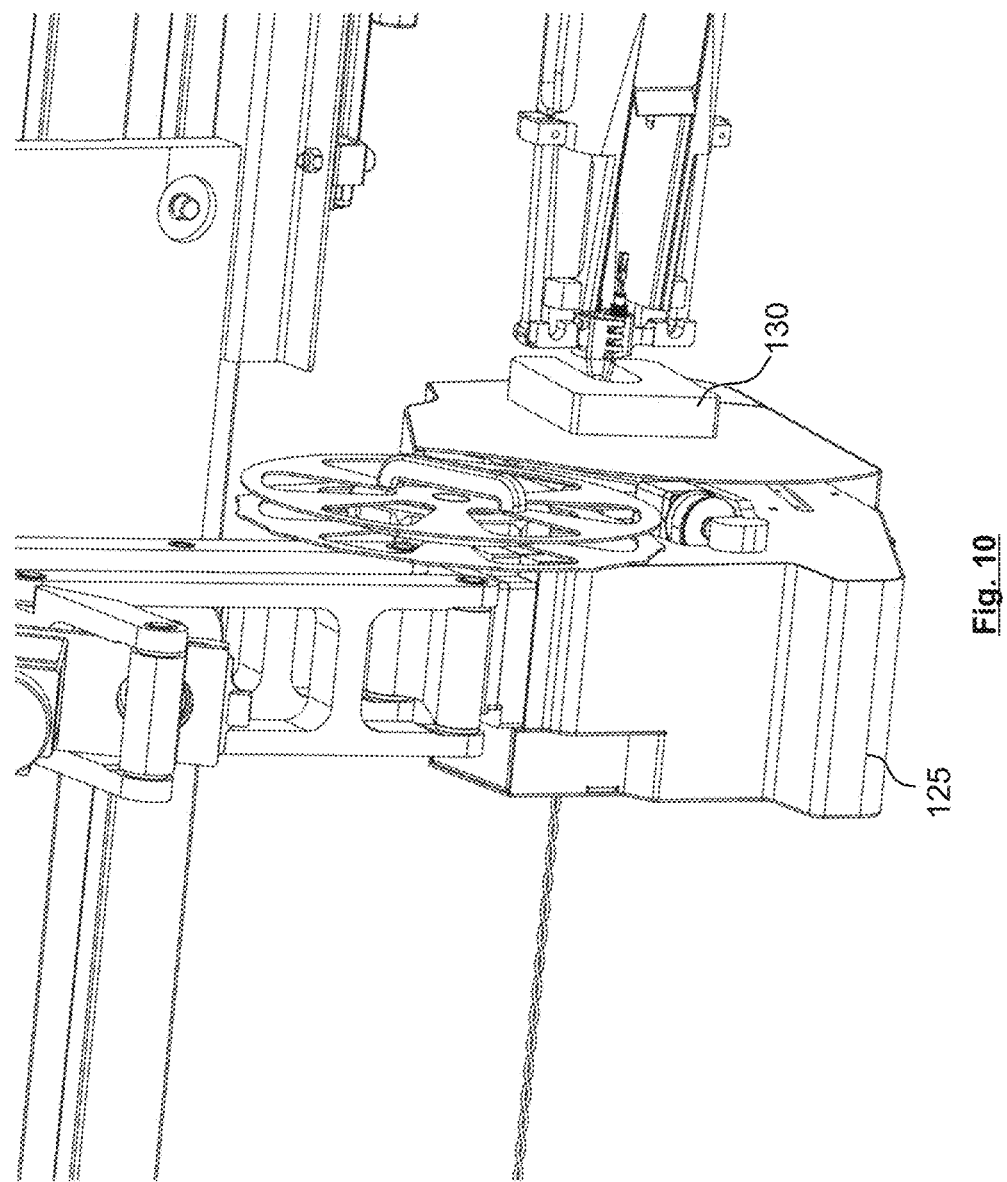
FIG. 10 a perspective view of an optical sensor arranged on the apparatus from FIG. 4 for distance measurement.

In FIG. 10, the non-stationary bundling device 125 is shown in a detailed perspective view; the following designs however are also optionally valid for the stationary bundling device 115. As can be recognized in FIG. 10, an optical sensor 130 is provided, which can check if the execution of the bundling process is correct. In particular, the sensor 130 can detect the presence or the lacking of, or also as an option, the position of the bundle binder with relation to the respective first intersection point P2 and P1. It becomes possible to monitor the position of the attached bundle binder as a quality value. A position value of the respective intersection points P1, P2, which is provided to the controller 200, also makes it possible to realign the position of the respective bundling region 15, 18 in the adaptive manner.

The sensor 130 is typically mounted directly on the respective bundling device 115, 125 and is moved together with it. For example, the sensor 130 can be moved across the bundling region 15, 18 and the first intersection point P1, P2, typically along the wire axis. Here, a line-by-line intensity image ("shadow image") of this region can be acquired for analysis. A digital camera with illumination is also possible as a sensor 130, which can also be moved along the wire axis and the images of which are, for example, analysed by means of an image evaluation software.

If the optical sensor 130 are used for quality monitoring, the bundling devices 115, 125 carry out the movements necessary for the measurement along the axes of the wires 11, 12. The measured data are transferred to the machine controller and evaluated.

In order to complete the bundling process, the bundling devices 115, 125 swivel back into the position outside of the axis of the wires 11, 12 and the finished cable is discharged. If a quality monitoring is used, the finished cable can be added to a corresponding storage, for example a storage tray, which corresponds to the detected quality.

The invention claimed is:

1. An apparatus for processing a plurality of electrical wires, wherein the apparatus is configured to guide a leading end of a plurality of wires through a zone of a processing region, and to hold a lagging end of the wires in the zone of the processing region, the apparatus comprising:
    a non-stationary holding device that is non-stationary along a linear guiding direction, configured to hold the leading end of the wires;
    a non-stationary bundling device that is non-stationary along the linear guiding direction by means of a controllable drive and is separate from the non-stationary holding device, which comprises a bundling segment, wherein the bundling segment is configured to bundle a bundling region on the leading end of the wires;
    a controller connected to the drive of the non-stationary bundling device, configured to control the drive in such a way that a distance between the bundling segment of the non-stationary bundling device and the non-stationary holding device assumes a specified or a specifiable distance;
wherein the apparatus is further configured to twist at least one of the leading and the lagging end of the wires;
wherein the apparatus further comprises:
    a distance measuring device configured to measure a distance between the bundling segment of the non-stationary bundling device and the non-stationary holding device,
wherein the controller is additionally connected to the distance measuring device.

2. The apparatus according to claim 1, which furthermore comprises the following:
    a stationary bundling device, arranged in the processing region and configured to bundle a bundling region on the lagging end of the wires.

3. The apparatus according to claim 2, wherein one or both the non-stationary bundling device and the stationary bundling device each comprises a sensor, wherein the respective sensor is configured to detect a first intersecting position of the wires and/or to detect the presence of a bundle binder and/or to detect a position of the bundle binder.

4. The apparatus according to claim 3, wherein the controller is configured to further use a detection result from the sensor, which indicates the first intersecting position of the wires, to control the drive.

5. The apparatus according to claim 3, wherein the sensor comprises an optical line sensor and the first intersecting position of the wires is assumed at a position, which corresponds to the position on the optical line sensor, at which a difference of the signal intensity of the adjacent image points of the optical line sensor exceeds a predetermined threshold.

6. The apparatus according to claim 3, wherein the sensor comprises an optical sensor with an illumination means and a digital camera.

7. The apparatus according to claim 1, wherein the non-stationary bundling device is configured to wrap the wires with a bundle binder.

8. The apparatus according to claim 1, wherein the non-stationary bundling device comprises a positioning device independent from the drive, wherein the positioning device is configured to position the bundling segment of the bundling device in relation to the wire end to be bundled.

9. The apparatus according to claim 1, wherein the non-stationary holding device can be moved along a holding device linear guide, wherein the non-stationary bundling device can be moved along a bundling device linear guide, wherein the holding device linear guide and the bundling device linear guide are separate from one another and run parallel with one another.

10. The apparatus according to claim 1, wherein the distance measuring device comprises a magnetostrictive position measuring system, a magnetic position measuring system or an optical position measuring system.

11. The apparatus according to claim 1, wherein the distance measuring device comprises a position indicator and path-sensor device, wherein the position indicator is arranged on a linear guide of the non-stationary holding device.

* * * * *